United States Patent Office 2,853,895
Patented Sept. 30, 1958

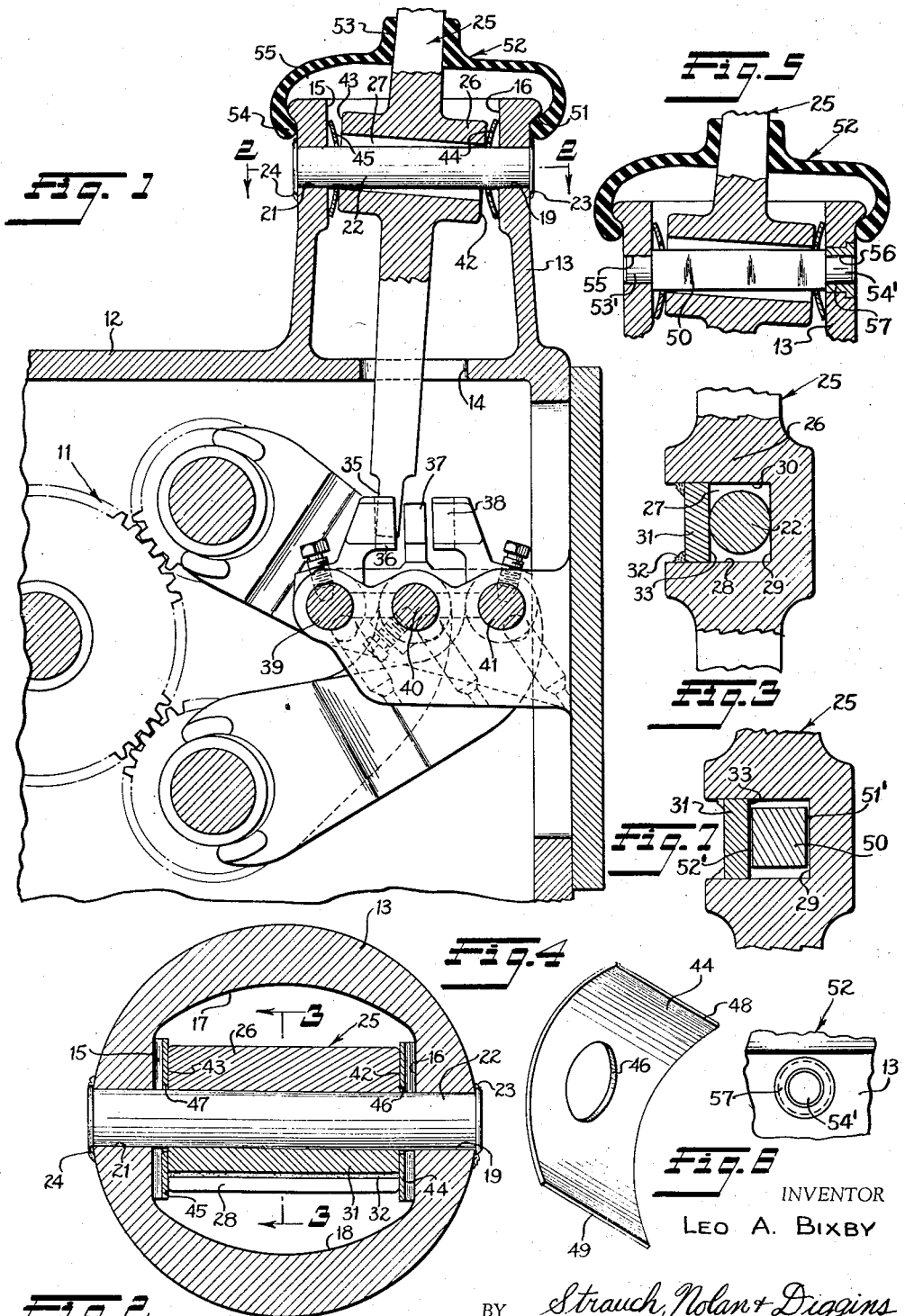
Sept. 30, 1958
L. A. BIXBY
2,853,895
TRANSMISSION SHIFT LEVER MOUNTING
Filed March 12, 1953
INVENTOR
LEO A. BIXBY
BY Strauch, Nolan + Diggins
ATTORNEYS

2,853,895

TRANSMISSION SHIFT LEVER MOUNTING

Leo A. Bixby, Niles, Mich., assignor, by mesne assignments, to Rockwell Spring and Axle Company, Coraopolis, Pa., a corporation of Pennsylvania Application March 12, 1953, Serial No. 341,982

3 Claims. (Cl. 74—473)

This invention relates to variable speed automotive transmissions and more particularly to mounting of the gear shift lever in such transmissions.

In the change speed gear mechanism of conventional transmissions used in tractors, trucks and other automotive vehicles, a manually operated shift lever is mounted on the transmission housing so as to be tilted in one direction to selectively engage a particular shift fork and then rocked in a direction substantially at right angles to the first tilt direction for sliding the shift forks along support rails to effect the desired gear transfer.

The present invention is concerned with the mounting of the shift lever for such transmissions Prior to the invention shift lever mountings of many different constructions were proposed and used. Most of these comprise ball and socket joints mounted in a tower on the transmission housing with the joint elements retained in association by compressed coil springs, and all of them involved fairly complex structures which required considerable expensive machining and labor for installation. Also the more complex the structure, the more chances there are for failure of parts, and service difficulties are becoming increasingly important due to lack and expense of skilled labor.

The invention provides a structurally simple shift lever mounting that is easy to manufacture, assemble and repair. The machining operations are reduced to a minimum and stock material is mainly used so that the expenses for parts and labor are minimized. The mounting is particularly sturdy for withstanding heavy duty work such as in tractors, but can be readily repaired in the field. In general there is no modification required as to the transmission gearing, and the lever is of special construction to coact with a simple cylindrical pivot and tilt limiting pin for obtaining and restricting the necessary movements of the lever without additional parts.

It is therefore the major object of the invention to provide a sturdy reliable transmission shift lever mounting which comprises a minimum of inexpensive parts in novel assembly.

A further object of the invention is to provide a novel transmission shift lever mounting wherein the lever is supported upon a pin for rocking about the pin axis and limited tilting generally in the direction of the pin axis.

It is a further object of the invention to provide a novel transmission shift lever mounting wherein the hub of the lever is rockably and tiltably mounted on an arbor and resiliently controlled by special leaf springs at opposite ends of the hub.

A further object of the invention is to provide a novel shift lever for an automobile transmission having a special hub mounting structure.

Further objects of the invention will appear as the description proceeds in connection with the appended claims and the annexed drawings wherein:

Figure 1 is a fragmentary elevation partly in section of an automobile transmission assembly illustrating a shift lever mount according to a preferred embodiment of the invention;

Figure 2 is a section on line 2—2 of Figure 1 showing further details of the shift lever mount;

Figure 3 is generally a section on line 3—3 of Figure 2 showing the pin receiving slot in the shift lever;

Figure 4 is a perspective view of one of the leaf springs in the shift lever mount;

Figure 5 is a fragmentary elevation mainly in section of the upper part of the transmission wherein the shift lever is mounted upon a non-circular rockable pin according to a further embodiment of the invention;

Figure 6 is a fragmentary end elevation of the structure of Figure 5; and

Figure 7 is a section, similar to that of Figure 3, through the shift lever of the embodiment of Figure 5.

Referring to the drawings, variable transmission gears of a conventional type indicated generally at 11 are enclosed within a housing 12 that has an upstanding tower 13 communicating with the interior of the housing through an opening 14.

As illustrated in Figure 2, the hollow interior of the tower 13 has parallel flat opposite side faces 15 and 16 joined by arcuate faces 17 and 18. The tower is laterally apertured generally centrally of faces 15 and 16 to provide cylindrical openings 19 and 21 in axial alignment and adapted to receive a cylindrical pin or arbor 22. Pin 22 preferably fits the openings with a force fit and to hold it against rotation therein its opposite ends are locked to the tower as by peening and/or welding at 23 and 24. Thus stationary pin 22 bisects the interior of tower 13.

A shift lever 25 whose upper end has the usual manual operating knob (not shown) is mounted on pin 22 for rocking about the axis of pin 22 and for limited tilting in a vertical plane containing the axis of pin 22.

Shift lever 25 is formed with enlarged hub 26 which is generally rectangular as shown in Figure 3 and which has a length as shown in Figure 1 slightly less than the distance between faces 15 and 16. Hub 26 is solid except for a slot 27 that is open at both ends of the hub and also at one side of the hub as shown in Figure 3. Slot 27 is preferably milled into the hub and is square-cornered with perpendicularly disposed flat side surfaces 28, 29 and 30. The open side of slot 27 is closed by a plate 31 welded as at 32 to be rigid with the lever and having a flat inner surface 33 parallel to slot surface 29. Thus a laterally extending opening is formed in the lever.

In the assembly pin 22 freely passes longitudinally through slot 27 with its opposite sides in substantially tangential sliding contact with surfaces 29 and 33, so that although lever 25 can rock about the axis of pin 22 there can be no relative tilting of the lever 25 and pin 22 in the horizontal plane. However, since as shown in Figure 3 the distance between surfaces 28 and 30 is greater than the diameter of pin 22, limited tilting of lever 25 about pin 22 is permitted.

The lower end of shift lever 25 is formed with a conventional terminal 35 for engagement with one of sockets 36, 37 or 38 on shift forks slidable along rails 39, 40 and 41 respectively in the transmission when lever 25 is tilted as in Figure 1. The lower end of lever 25, the shift forks and the gearing in the transmission housing are all conventional. The length and depth of the hub slot 27 are such that when lever 25 is tilted to the position to enter socket 36 as in Figure 1 further tilting is blocked by contact of opposite corners with pin 22. Similarly the other limit position where the lever enters socket 38 is determined by pin and slot edge corner contact. Flat parallel end faces 42 and 43 on the hub ends are perpendicular to slot 27 and the hub length is such that these faces 42 and 43 do not engage or bind on the tower during movement of the shift lever.

Rectangular leaf springs 44 and 45 are compressed between faces 16 and 42 at one end of the hub and faces 15 and 43 at the other end of the hub which is otherwise capable of endwise movement with respect to pin 22. The leaf springs are preferably normally concavo-convex and centrally apertured at 46 and 47. These apertures are slightly greater in diameter than pin 22 to be loose with respect to pin 22 which passes through them. In the assembly, springs 44 and 45 are placed on shaft 22 with their convex sides engaging the flat end faces 42 and 43 respectively of the hub, and the upper and lower edges 48 and 49 of each spring slidably engages one of faces 15 or 16, each spring being compressed between the lever hub and the tower. The springs because of their size and shape do not rotate about pin 22.

When lever 25 is tilted clockwise as in Figure 1, hub face 43 is displaced upwardly with respect to spring 45 thereby shifting the line of pressure contact between the hub and spring downwardly, and hub face 42 is displaced downwardly with respect to spring 44, thereby shifting the line of pressure contact between the hub and spring upwardly. The hub shifts longitudinally slightly on pin 22 during this action. This produces a force couple resiliently tending to rock the lever 25 counterclockwise in Figure 1 to return it to neutral in engagement with socket 37. An opposite force couple is created when the lever is tilted to engage socket 38.

Above pin 22, tower 13 is formed with an external annular round extending lip 51. A protective tower closure boot 52 is provided between the lever and the tower. Boot 52 is preferably made of synthetic rubber with a relatively heavy collar 53 gripping lever 25, a heavy beaded ring 54 resiliently surrounding lip 51 and a relatively thin flexible skirt 55 between the bead and the body.

The invention provides a reliable, simplified, inexpensive shift lever mounting having very few parts. It enables the use of a low transmission housing shift tower boss, with a simple mounting pin driven through holes in said tower and peened or otherwise anchored in place during the assembly. Simple leaf springs tend to return the shift lever to the neutral position by force couples created by said springs when said shift lever is tilted to one side or the other.

While I have disclosed the pin in the preferred embodiment as fixed and cylindrical it is within the scope of the invention to provide a non-circular such as rectangular cross-section pin having opposite flat sides in sliding contact with faces 29 and 33, and with opposite ends of the pin rotatable in the openings 19 and 21 about a fixed axis. In such a structure the lever would be rockable about the pin axis.

This further embodiment of the invention is illustrated in Figures 5–7 wherein a pin 50 which is rectangular in cross-section has its opposite smooth flat sides 51' and 52' slidably engaged with faces 29 and 33 of lever 25, and its cylindrical outer ends 53' and 54' are journaled in bores 55 and 56 at opposite sides of the tower. Bore 55 is formed directly in the tower wall on one side but bore 56 is formed in a plug 57 that is press fitted into a bore 58 in the other side that is large enough to permit longitudinal insertion of pin 50 before the plug is inserted. The springs 44 and 45 are suitably apertured to clear the pin.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a variable speed transmission, a housing, a pin in said housing having a fixed axis, a gear shift lever slotted to surround said pin with opposed sides slidably engaging said pin and with the slot elongated lengthwise of the lever so that the lever has both rocking movement about the pin axis and tilting movement longitudinally of the pin, flat parallel faces on each side of the lever at the ends of the slotted opening substantially perpendicular to the opening and flat parallel faces on the interior of the housing about the pin substantially perpendicular to the pin axis, and arcuate leaf springs apertured to be mounted on the pin compressed between each flat lever side face and the associated housing face, each of said springs having its convex side slidably bearing on the lever side face and spaced edges slidably bearing on said associated housing face.

2. In a variable speed transmission, a housing, a fixed cylindrical pin within said housing, a gear shift lever having an elongated transverse hub formed with a longitudinal opening that is rectangular, two opposite sides of said opening parallel to the length of said lever being substantially tangentially engaged with said pin and the other two sides of the opening being spaced apart a distance greater than the pin diameter, parallel flat end faces on said hub normal to the axis of the opening, parallel flat faces on the interior of said housing surrounding the pin ends substantially perpendicular to the axis of said pin and spaced apart greater than the length of said hub, and arcuate leaf springs apertured for mounting on said pin compressed between each hub end face and the adjacent housing face with the convex side of the spring engaging the hub end face.

3. In the variable speed transmission defined in claim 2, said opening being formed by a slot cut into one side of said hub and a plate secured along the open side of the slot.

References Cited in the file of this patent

UNITED STATES PATENTS

| | | |
|---|---|---|
| 1,446,068 | Rhoads | Feb. 20, 1923 |
| 1,564,622 | Prosser | Dec. 8, 1925 |
| 1,886,849 | Tenney | Nov. 8, 1932 |
| 2,174,504 | Cole | Sept. 26, 1939 |